United States Patent [19]
Sato et al.

[11] Patent Number: 5,884,833
[45] Date of Patent: Mar. 23, 1999

[54] ULTRASONIC VIBRATION SOLDERING APPARATUS AND RESONATOR USED THEREIN

[75] Inventors: Shigeru Sato; Mitsugu Katsumi; Ryoichi Ishii, all of Fukuoka-ken, Japan

[73] Assignee: Ultex Corporation, Fukuoka, Japan

[21] Appl. No.: 839,318

[22] Filed: Apr. 17, 1997

[30] Foreign Application Priority Data

Jun. 28, 1996 [JP] Japan ................................. 8-170083

[51] Int. Cl.$^6$ ........................................................ B23K 3/00
[52] U.S. Cl. ............................ 228/36; 228/56.2; 228/262
[58] Field of Search ............................ 228/56.2, 36, 37, 228/111.5, 262

[56] References Cited

U.S. PATENT DOCUMENTS

| | | |
|---|---|---|
| 3,752,381 | 8/1973 | Watson . |
| 3,762,368 | 10/1973 | Strube et al. .......................... 118/429 |
| 3,934,781 | 1/1976 | Klauke et al. ............................. 228/37 |
| 3,945,618 | 3/1976 | Shoh ...................................... 366/118 |
| 4,203,531 | 5/1980 | Reichel et al. ............................ 228/36 |
| 5,762,257 | 6/1998 | Garrecht .................................. 228/37 |

FOREIGN PATENT DOCUMENTS

| | | |
|---|---|---|
| 2547225 A | 12/1984 | France . |
| 2231908 A | 1/1974 | Germany . |

*Primary Examiner*—Samuel M. Heinrich
*Attorney, Agent, or Firm*—Kanesaka & Takeuchi

[57] ABSTRACT

A support portion for attaching a horn main body to a solder tank is provided on the horn main body at a nodal point f2 and ultrasonic vibration from an external transducer is transmitted to solder in the solder tank through the horn main body.

3 Claims, 8 Drawing Sheets

ULTRASONIC VIBRATION SOLDERING APPARATUS AND RESONATOR USED THEREIN

BACKGROUND OF THE INVENTION

1. [Field of the Invention]

This invention relates to an ultrasonic vibration soldering apparatus for dipping a workpiece in solder by applying ultrasonic vibration to a solder solution heated and molten in a solder tank.

2. [Description of the Prior Art]

There is known ultrasonic soldering that a workpiece is dipped in solder by applying ultrasonic vibration to solder heated and molten in a solder tank without coating a portion to be soldered of the workpiece with a flux.

In such ultrasonic soldering, an attempt is being made to apply ultrasonic vibration to the workpiece from an ultrasonic horn through the solder optimally by attaching the ultrasonic horn, a part for applying ultrasonic vibration to the solder, to the solder tank at a position below the surface of the solder in such a manner that it penetrates the wall of the solder tank and arranging the ultrasonic horn and the workpiece dipped in the molten solder to face each other. As the soldered area of the workpiece facing the ultrasonic horn expands, the ultrasonic vibration application area of the ultrasonic horn increases. Therefore, the vibration amplitude in the ultrasonic vibration application area becomes weaker and weaker as the distance of the transducer attached to the ultrasonic horn from the area increases and the solder is liable to be adhered to the workpiece to a nonuniform thickness.

Figure 17:
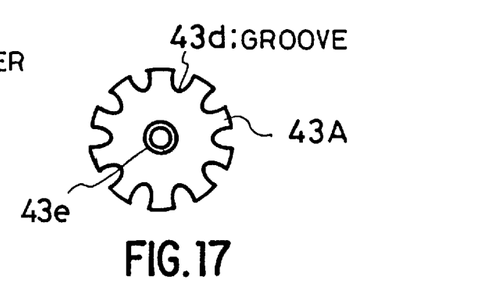
FIG. 17 shows an ultrasonic horn having slots of the prior art, wherein Fig. A is a plan view and Figs. B to D are sectional views taken on line A—A of Fig. A.

As shown in FIG. 17, it has been known that the vibration amplitude state is improved by forming slots 1-10$b$, 1-10$c$, 1-10$d$ and 1-10$d$ in the horn main body 1-10$a$ of an ultrasonic horn 1-10 used for bonding other than soldering and other processing making use of ultrasonic vibration. FIG. 17$a$ is a plan view of the ultrasonic horn 1-10 which has a threaded hole 1-10$f$ for connecting an unshown transducer or booster in the center of one end surface of the horn main body 1-10$a$ and a plurality of slots 1-10$b$ at an equal distance from the threaded hole 1-10$f$ and on both right and left sides of the threaded hole 1-10$f$. FIGS. 17$b$ to 17$d$ are sectional views of variations of the slots, wherein FIG. 17$b$ shows that a slot 1-10$c$ is provided through the horn main body 1-10$a$, FIG. 17$c$ shows that slots 1-10$d$ are counter bored from the front and rear sides of the horn main body 1-10$a$ and closed at an intermediate portion corresponding to the threaded hole 1-10$f$, and FIG. 17$d$ shows that a slot 1-10$e$ is counter bored from the rear side of the horn main body 1-10$a$ and closed at the front side of the horn main body 1-10$a$.

When the ultrasonic horn 1-10 having the above common slots 1-10$b$, 1-10$c$, 1-10$d$ or 1-10$e$ shown in FIG. 17 is attached to the solder tank at a position below the surface of the solder in such a manner that it penetrates the wall of the solder tank, the solder molten inside the solder tank flows out to the outside through the slots 1-10$b$, 1-10$c$, 1-10$d$ or 1-10$e$ because the slots 1-10$b$, 1-10$c$, 1-10$d$ or 1-10$e$ communicate with both the inside and outside of the solder tank. Therefore, this constitution can be hardly employed.

SUMMARY OF THE INVENTION

It is therefore an object of the present invention to provide an ultrasonic vibration soldering apparatus which prevents the solder from leaking from the solder tank to the outside and is capable of improving the vibration amplitude state.

According to a first aspect of the invention, there is provided an ultrasonic vibration soldering apparatus in which a support portion is provided in a horn main body at a nodal point where the vibration amplitude is minimum and is installed in a solder tank. Since the support portion is not applied with vibration so much, it can be prevented from being damaged or broken through long-time use.

According to a second aspect of the invention, there is provided an ultrasonic vibration soldering apparatus in which the support portion is formed of a plate material which projects in a direction perpendicular to the front and rear directions of the horn main body from the outer peripheral surface of the horn main body. Since the horn main body can be installed in the solder tank by means of the plate material, it can be easily installed.

According to a third aspect of the invention, there is provided an ultrasonic vibration soldering apparatus in which the support portion is formed around the outer peripheral surface of the horn main body at the nodal point. Since the horn main body can be held from therearound, holding power can be increased.

According to a fourth aspect of the invention, there is provided an ultrasonic vibration soldering apparatus in which the horn main body and the support portion are integrated with each other as a single unit. Since the support portion cannot be disconnected from the horn main body, reliability can be improved.

According to a fifth aspect of the invention, there is provided an ultrasonic vibration soldering apparatus in which slots are formed in the front and rear portions of the horn main body with the support portion interposed therebetween. Since the slots are separated from one another, a solder solution is prevented from leaking to the outside through the slots.

According to a sixth aspect of the invention, there is provided an ultrasonic vibration soldering apparatus in which two interconnected boosters are interposed between the horn main body and a transducer. Therefore, ultrasonic vibration can be transmitted to the horn main body efficiently.

According to a seventh aspect of the invention, there is provided an ultrasonic vibration soldering apparatus in which a booster close to the horn main body is formed like a rod and a booster close to the transducer is formed of a fin booster having a plurality of fins on the outer peripheral surface thereof. Therefore, heat radiation properties can be improved.

According to an eighth aspect of the invention, there is provided an ultrasonic vibration soldering apparatus in which the fins are provided in a longitudinal direction of the fin booster. Therefore, heat radiation properties can be improved more efficiently.

According to a ninth aspect of the invention, there is provided an ultrasonic vibration soldering apparatus in which a support portion projecting outward is provided on the outer peripheral surface of a resonator at a nodal point, a receiving portion having a receiving surface formed on a stepped portion formed by the difference of diameter between a hole extending through the solder tank and larger than the outer diameter of a front half portion before the support portion of the resonator and a hole larger in diameter than the hole and into which the support portion of the resonator can be inserted is formed in the solder tank, and pressing members for holding the support portion of the resonator whose front half portion is inserted into the hole of the receiving portion without contact with the receiving surface of the receiving portion are fastened to the receiving portion. Therefore, the horn main body can be secured with the solder tank.

The above and other objectives, features and advantages of the invention will become more apparent from the following description when taken in conjunction with the accompanying drawings.

DETAILED DESCRIPTION OF THE PREFERRED EMBODIMENTS

Figure 1:
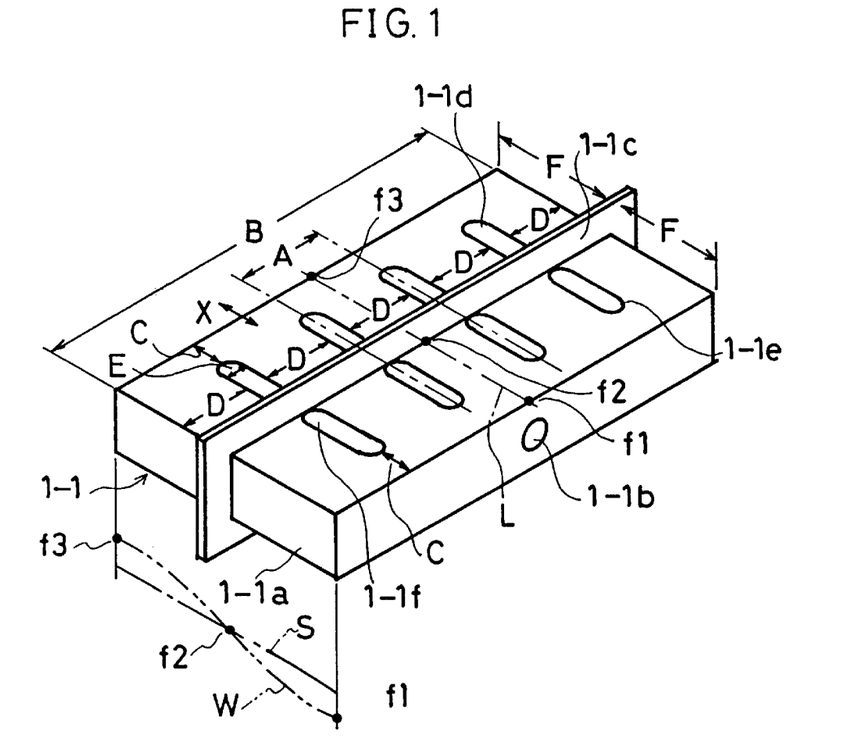
FIG. 1 is a perspective view of a first embodiment of the present invention.
Figure 2:
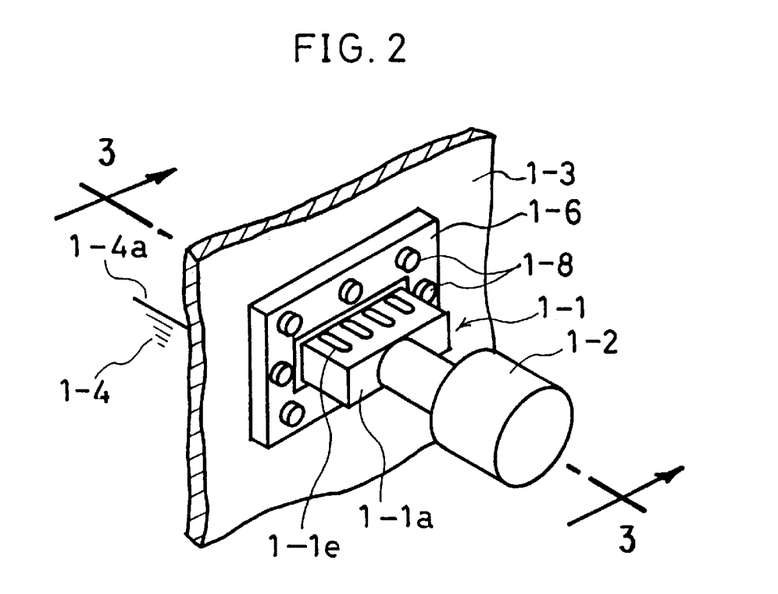
FIG. 2 is a perspective view of the first embodiment of the present invention in which an ultrasonic horn is attached to a solder tank.
Figure 3:
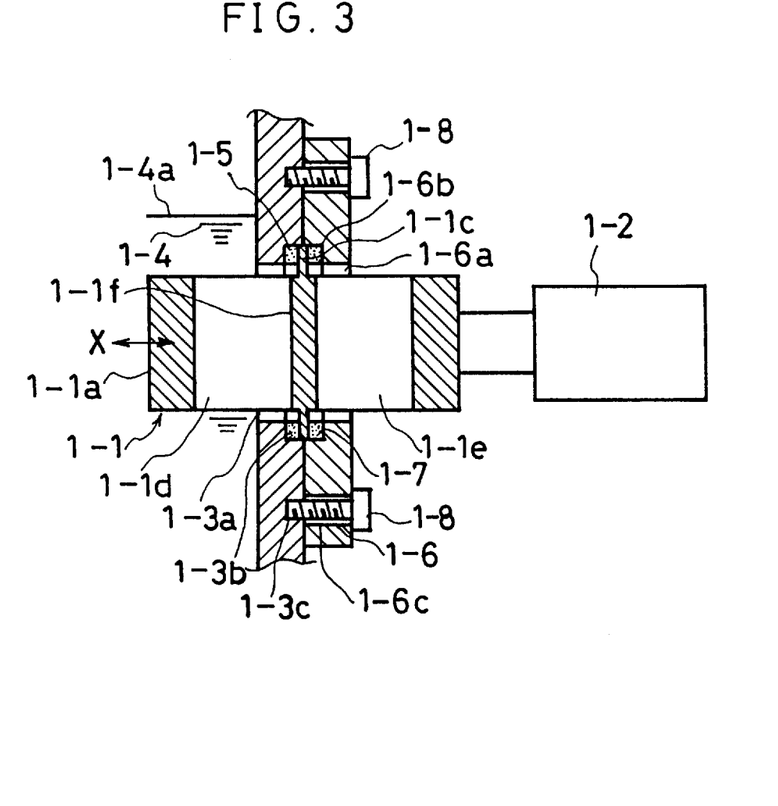
FIG. 3 is a sectional view taken on line A—A of FIG. 2.

FIGS. 1 to 3 show a first embodiment of the present invention. Firstly, in FIG. 1, an ultrasonic horn 1-1 has a tetragonal horn main body 1-1a formed rectangular or square and made from an alloy such as titanium alloy. In this embodiment, in the horn main body 1-1a depicted to be long sidways, a transverse direction L shown by a one-dot chain line is specified as the transmission direction of ultrasonic vibration and has a length equal to ½ the wavelength of a resonance frequency from the maximum vibration amplitude point f1 to the next maximum vibration amplitude point f3. A connection threaded hole 1-1b is formed in the center of one end surface out of a pair of opposite end surfaces of the horn main body 1-1a in the transverse direction L. A support portion 1-1c formed of a plate material for attachment is installed around the horn main body 1-1a at the minimum vibration amplitude point f2 (nodal point) between the two maximum vibration amplitude points f1 and f3 in such as manner that it projects outward in the form of a rectangular ring. Since the support portion 1-1c projects in a direction perpendicular to the front and rear directions of the horn main body 1-1a, a plurality of slots 1-1d and 1-1e formed in the front and rear portions of the horn main body 1-1a with the support portion 1-1c interposed therebetween. Reference letter A in FIG. 1 indicates the center interval between the inner slots 1-1d and 1-1d near the threaded hole 1-1b and the center interval between inner slots 1-1e and 1-1e near the threaded hole 1-1b, B indicates the width of the horn main body 1-1a in a longitudinal direction, C the interval between the slots 1-1d and 1-1e and the end surface of the horn main body 1-1a in a transverse direction, E the width of each of the slots 1-1d and 1-1e, D the interval between the adjacent slots 1-1d and 1-1e in the longitudinal direction of the horn main body 1-1a and the interval between the outer slots 1-1d and 1-1e and the end surface of the horn main body 1-1a in a longitudinal direction, and F the interval between the support portion 1-1c and the end surface of the horn main body 1-1a in a longitudinal direction. In the above constitution, the support portion 1-1c and the horn main body 1-1a are integrated with each other as a single unit.

In FIGS. 2 and 3, to install the ultrasonic horn 1-1 in a solder tank 1-3, a transducer 1-2 which is an electro-acoustic or electro-vibration transducer formed of a piezoelectric element or magnetostrictive element for converting into mechanical energy electric energy for generating and outputting vertical ultrasonic vibration having a predetermined frequency with power supplied from an unshown ultrasonic generator is connected to the ultrasonic horn 1-1 with the threaded hole 1-1b formed in the ultrasonic horn 1-1, an unshown threaded hole formed in the transducer 1-2 and unshown headless screws to be screwed into the threaded hole 1-1b and the unshown threaded hole.

For a soldering operation, a square through hole 1-3a which is larger than a front half portion of the horn main body 1-1a and smaller than the outer diameter of the support portion 1-1c is formed in the solder tank 1-3 at a position below the surface 1-4a of solder 1-4. A square recess portion 1-3b is formed in the exterior side of the solder tank 1-3 around the through hole 1-3a. A sealing member 1-5 which is formed substantially the same square as the recess portion 1-3b and is made from an anti-solder material to which the solder is hardly adhered is fitted in the recess portion 1-3b, or the sealing member 1-5 is installed along the support portion 1-1c around the front half potion of the horn main body 1-1a and then the front half portion of the horn main body 1-1a is inserted into the through holes 1-3a from the outside of the solder tank 1-3 in such a manner that it projects into the inside of the solder tank 1-3.

Meanwhile, a bracket 1-6 for fixing the ultrasonic horn 1-1 to the solder tank 1-3 is formed rectangular and has a through hole 1-6a having the same shape as the through hole 1-3a of the solder tank 1-3 and a recess portion 1-6b having the same shape as the recess portions 1-3b of the solder tank 1-3. A sealing member 1-7 made from the same material and having the same shape as the sealing member 1-5 is fitted in the recess portion 1-3b of the bracket 1-6, or the sealing member 1-7 is installed along the support portion 1-1c around the rear half portion of the horn main body 1-1a and then bolts 1-8 are screwed into a plurality of threaded holes 1-3c formed around the recess portion 1-3b of the solder tank 1-3 through a plurality of through holes 1-6c formed in the bracket 1-6. Thereby, the support portion 1-1c prevents the leakage of the solder between the solder tank 1-3 and the bracket 1-6 by means of the sealing members 1-5 and 1-7 and the ultrasonic horn 1-1 connected to the transducer 1-2 is attached to the solder tank 1-3 in such a manner that it penetrates the wall of the solder tank 1-3.

According to the constitution of this embodiment, after the ultrasonic horn 1-1 is attached to the solder tank 1-3, the solder 1-4 is poured into the solder tank 1-3, an unshown heater provided in the solder tank 1-3 is activated to generate heat to melt the solder 1-4 in the solder tank 1-3, and then an unshown pump provided in the solder tank 1-3 is driven to cause the solder 1-4 to circulate in the solder tank 1-3. The circulating solder 1-4 covers the front half portion of the ultrasonic horn 1-1 projecting into the inside of the solder tank 1-3, the unshown workpiece is dipped in the solder 1-4 and arranged to face the ultrasonic horn 1-1, and the ultrasonic horn 1-1 is caused to resonate with ultrasonic vibration by supplying power to the transducer 1-2 so as to apply the solder 1-4 to the workpiece.

For this soldering operation, since a partition wall 1-1f located between the slots 1-1d and 1-1e in the front and rear half portions of the ultrasonic horn 1-1 with the support portion 1-1c interposed therebetween is present at a position corresponding to the support portion 1-1c, even when the ultrasonic horn 1-1 is attached to the solder tank 1-3 at a position below the surface 1-4a of the solder 1-4 in such a manner that it penetrates the wall of the solder tank 1-3, the slots 1-1d on the side where the molten solder 1-4 is present are isolated from the outside of the solder tank 1-3 by the partition wall 1-1f and the slots 1-1e on the side where the solder is not present are isolated from the inside of the solder tank 1-3 by the partition wall 1-1f. Thereby, such inconvenience can be eliminated that the solder 1-4 molten in the solder tank 1-3 is flown to the outside through the slots 1-1d and 1-1e and the vibration amplitude state of the ultrasonic horn 1-1 is improved by the slots 1-1d and 1-1e in the front and rear half portions of the ultrasonic horn 1-1, thereby making it possible to apply the solder 1-4 to the workpiece to an uniform thickness.

Figure 4:
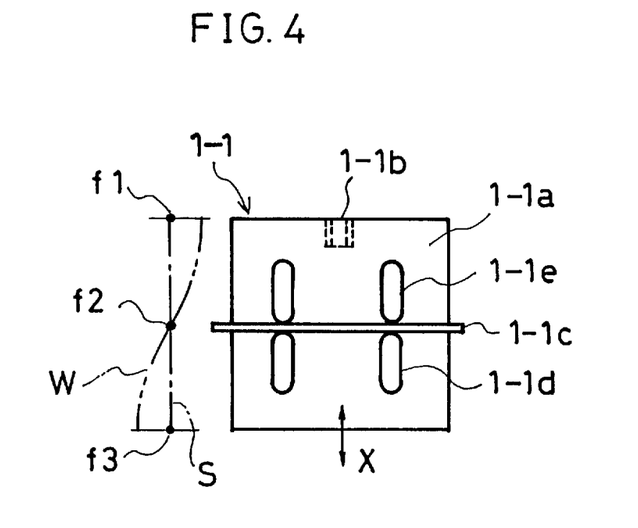
FIG. 4 is a plan view of a second embodiment of the present invention.

FIG. 4 shows a second embodiment of the present invention. Even when four slots 1-1d and 1-1e in total are formed in the front and rear half portions of the horn main body 1-1a of the ultrasonic horn 1-1 with the support portion 1-1c interposed therebetween in such a manner that they are disposed in right and left rows with the threaded hole 1-1b as the center, the same function and effect are obtained though they depend on the width in a horizontal direction of the horn main body 1-1a.

Figure 5:
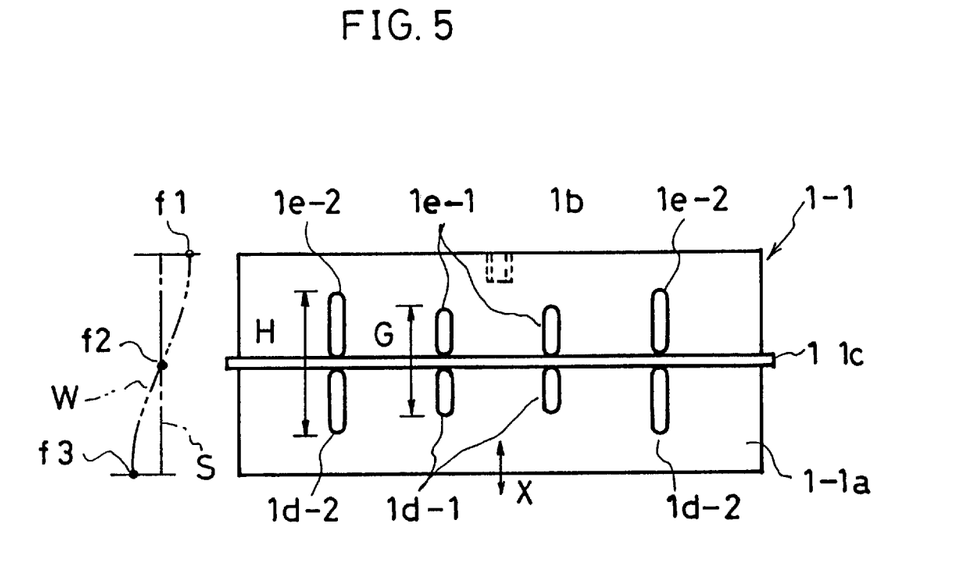
FIG. 5 is a plan view of a third embodiment of the present invention.

FIG. 5 shows a third embodiment of the present invention. If the length G in a vibration transmission direction of the inner slots 1d-1 and 1e-1 near the threaded hole 1-1b and the length H in the vibration transmission direction of the outer slots 1d-2 and 1e-2 far from the threaded hole 1-1b are made different, the vibration amplitude of the ultrasonic horn 1-1 can be adjusted such that the workpiece can be easily bonded according to the shape and size thereof. In this embodiment, G is made smaller than H.

Figure 6:
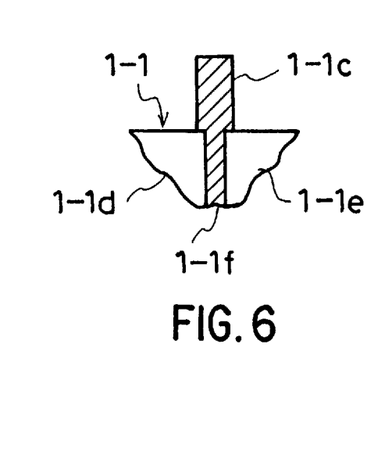
FIG. 6 shows a fourth embodiment of the present invention, wherein Fig. A is a sectional view and Fig. B is a plan view.

FIG. 6 shows a fourth embodiment of the present invention. When the slots 1-1d and 1-1d are formed in the front and rear half portions below the support portion 1-1c and the partition wall 1-1f is made thin, the slots 1-1d and 1-1e are operated as if they were not separated from one another, thereby making it possible to further improve the vibration amplitude state of the ultrasonic horn 1-1.

Reference letter W in FIGS. 1, 4 and 5 indicates a waveform showing the instantaneous displacement (vibration amplitude) of ultrasonic vibration caused by the resonance of the ultrasonic horn 1-1 and S indicates the reference line (zero line) of vibration amplitude.

Reference letter X in FIGS. 1, 3, 4 and 5 indicates the vibration direction of the ultrasonic horn 1-1.

In the above embodiments, the case where the ultrasonic horn 1-1 is directly connected to the transducer 1-2 has been described with reference to the accompanying drawings. Even when the ultrasonic horn 1-1 is connected to the transducer 1-2 through a booster by coaxially interconnecting the ultrasonic horn 1-1 and the booster with headless screws and threaded holes and connecting the transducer 1-2 to the booster with headless screws and threaded holes, which is not shown in the accompanying drawings, the same effect as that of the above embodiments is obtained. In this case, the number of boosters may be one or more.

Figure 7:
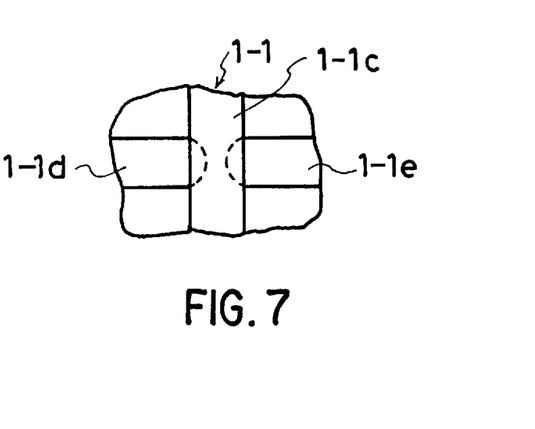
FIG. 7 is a sectional view taken on line A—A of FIG. 8 showing a fifth embodiment of the present invention.
Figure 8:
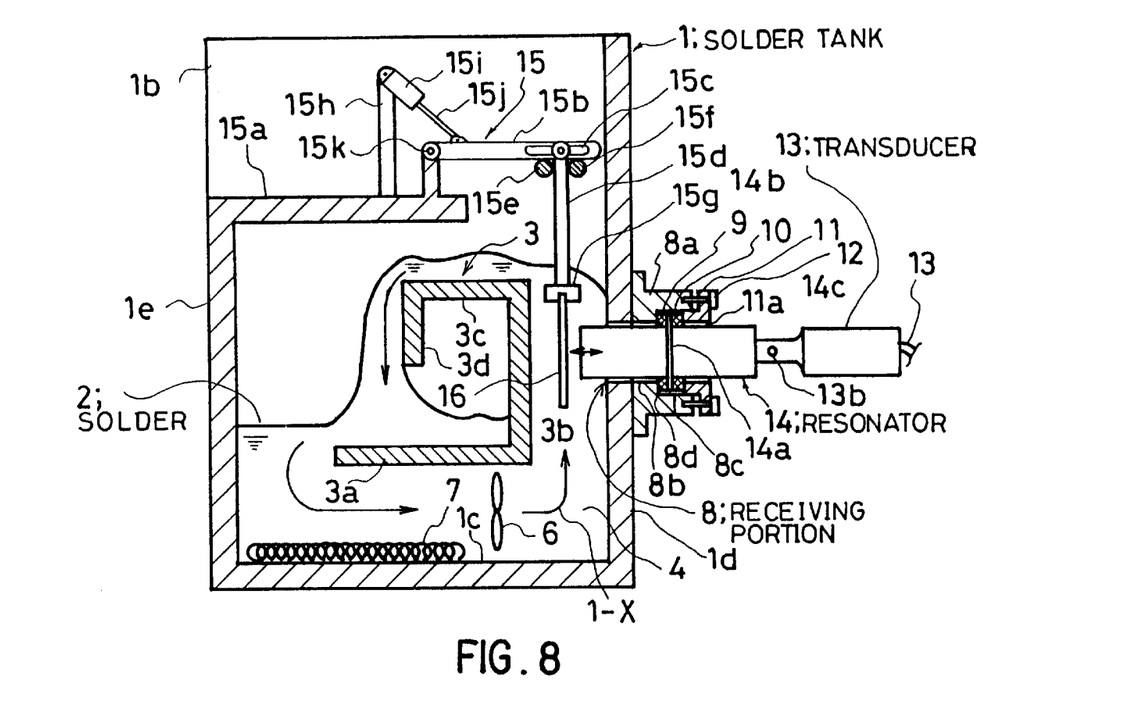
FIG. 8 is a perspective view of the fifth embodiment of the present invention.

FIGS. 7 and 8 show a fifth embodiment of the present invention. In these figures, a solder tank 1 is formed like a bathtub having an open upper portion for injecting molten solder 2, and a circulation passage 4 is formed in the solder tank 1 by a partition member 3 whose both ends are attached to the right and left walls 1a and 1b of the solder tank 1. A pump 6 and a heater 7 located on the upstream side of the pump 6 are arranged in the circulation passage 4 between the lower partition wall 3a of the partition member 3 and the bottom wall 1c of the solder tank 1. The solder 2 poured into the solder tank 1 is molten by the heating operation of the heater 7 and the molten solder 2 is circulated by the pump 6 in directions indicated by arrows.

In this embodiment, the solder 2 discharged by the pump 6 runs up in the circulation passage 4 between a front partition wall 3b and the front wall 1d of the solder tank 1 from the circulation passage 4 between the lower partition wall 3a and the bottom wall 1c of the solder tank 1, passes over an upper partition wall 3c, falls down along a rear partition wall 3d into the liquid surface of the solder 2 in the solder tank 1, flows over a rear end portion of the lower partition wall 3a, returns to the circulation passage 4 between the lower partition wall 3a and the bottom wall 1c of the solder tank 1 and is absorbed by the pump 6.

Figure 9:
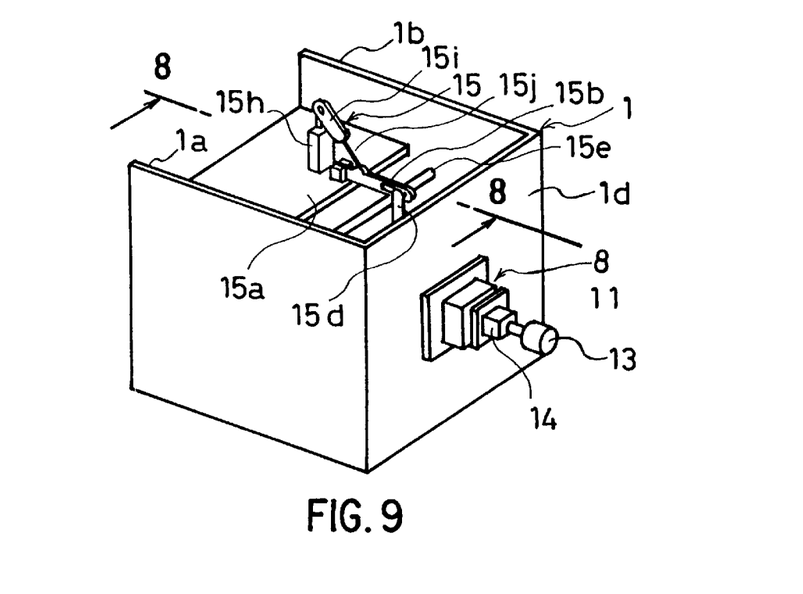
FIG. 9 is an exploded perspective view of key parts of the fifth embodiment of the present invention.

A receiving portion 8 provided in a portion constituting part of the circulation passage 4 at the front wall 1d of the solder tank 1 has a hole 8b extending from the front wall 1d to a projecting portion 8a projecting outward from the exterior surface of the front wall 1d, as shown in FIG. 9. The projecting portion 8a is formed separate from the solder tank 1 and is connected to the front wall 1d of the solder tank 1 by screws, welding or the like. The hole 8b has a rectangular section similar to and larger than the front half portion 14b located before the support portion 14a of a resonator 14 to be described later and communicates with the inside and outside of the solder tank 1. In front of the hole 8b, a hole 8c larger than the hole 8b is formed stepwise and coaxial with the hole 8b and a step surface formed like a closed loop in a connection portion between the hole 8c and the hole 8b serves as a receiving surface 8d for accepting the support portion 14a of the resonator 14. On the front end surface of the projecting portion 8a around the hole 8c, there are formed a plurality of threaded holes 8e disposed at equal intervals in a circumferential direction.

Sealing members 9 and 10 are formed from an anti-solder material to which molten solder 2 is hardly adhered, such as fluororesin or teflon and have substantially the same closed loop shape as the receiving surface 8d.

A pressing member 11 for holding the resonator 14 in the solder tank 1 with the receiving portion 8 has a window 11a having a similar shape to and larger than the rear half portion 14c located after the support portion 14a of the resonator 14 in the center portion thereof. Around the window 11a on the rear surface, the pressing member 11 has a closed loop-shaped projecting rib 11b which can be fitted into the hole 8c. Through holes 11c for accepting screws 12 are formed around the rib 11b of the pressing member 11 at positions corresponding to the threaded holes 8e of the receiving portion 8.

A transducer 13 is an electro-acoustic or electro-vibration transducer formed of a piezoelectric element or magneto-strictive element for converting into mechanical energy electric energy for generating and outputting vertical ultrasonic vibration having a predetermined frequency with power received from an unshown ultrasonic generator through an electric wire 13a. To the output end of the transducer 13 is coaxially connected the resonator 14 with unshown threaded holes formed in the output end and the connection end of the resonator 14 (the threaded hole formed in the resonator 14 is denoted by 14d in FIG. 9 and does not reach the front end surface of the resonator 14) and unshown screws to be screwed into these threaded holes, and the resonator 14 resonates with ultrasonic vibration transmitted from the transducer 13 and has a predetermined length to provide the maximum vibration amplitude points and the minimum vibration amplitude point (to be referred to as "nodal point" hereinafter). A recess portion 13b is formed in the outer peripheral surface of the output end of the transducer 13 so that the resonator 14 can be connected to the transducer 13 firmly or disconnected easily from the transducer 13 by inserting an unshown tool into this recess portion 13b when the resonator 14 is connected to the output end of the transducer 13 or disconnected from the output end of the transducer 13.

Figure 10:
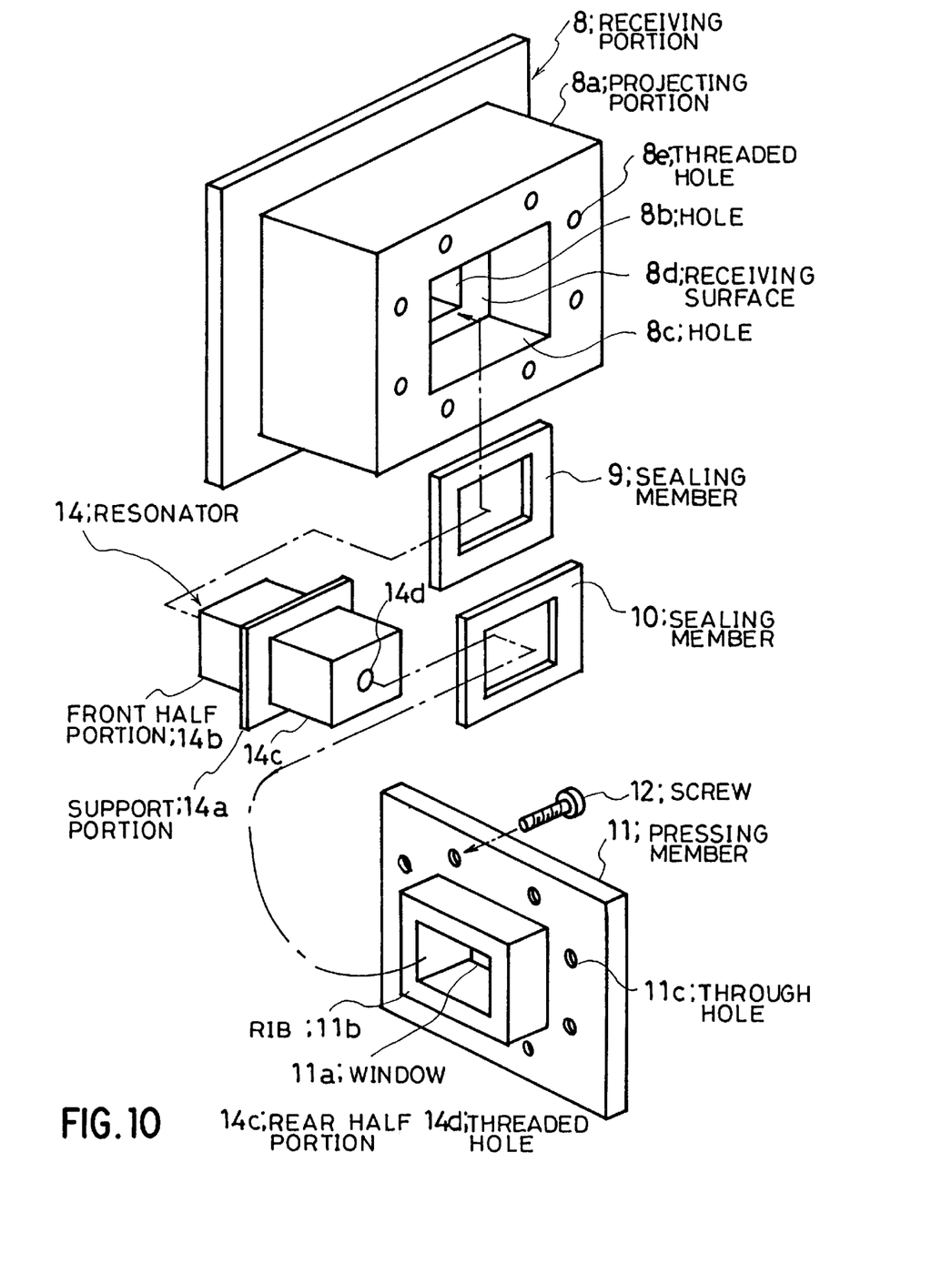
FIG. 10 is a diagram showing the relationship among the resonator, transducer and ultrasonic vibration waveform of the fifth embodiment of the present invention.

In this embodiment, the resonator 14 is formed like a rod and made from an alloy such as a titanium alloy having good acoustic properties, and as shown in FIG. 10, is an ultrasonic horn itself which applies ultrasonic vibration to the molten solder 2. Further, when seen from the transducer 13, it is formed like a prism having a length equal to ½ the wavelength from the maximum vibration amplitude point f1 to the next maximum vibration amplitude point f3 through the nodal point f2. To the center portion of the end surface of the rear half portion 14c of the resonator 14 is connected the output end of the transducer 13 and the resonator 14 has a closed loop-shaped support portion 14a which projects outward from the outer peripheral surface at the nodal point f2.

To attach the resonator 14 to the solder tank 1, the sealing member 10 and the pressing member 11 are fitted onto the rear half portion 14c of the resonator 14 and the transducer 13 is connected to the resonator 14. The other sealing member 9 is fitted onto the front half portion 14b of the resonator 14 and the front half portion 14b of the resonator 14 is inserted into the hole 8b through the hole 8c from the outside of the solder tank 1 while the pump 6 and the heater 7 provided in the solder tank 1 are out of operation, preferably the solder is not contained in the solder tank 1, so that the front end portion of the resonator 14 projects into the inside of the solder tank 1. Thereafter, the window 11a of the pressing member 11 is fitted onto the rear half portion 14c of the resonator 14, and the screws 12 are screwed into the threaded hole 8e of the receiving portion 8 through the through hole 11c of the pressing member 11, whereby the rib 11b of the pressing member 11 presses the support portion 14a and the sealing members 9 and 10 against the receiving surface 8d. As a reaction, the sealing members 9 and 10 are compressed by the rib 11b, the receiving surface 8d and the support portion 14a while they store restoring elasticity, and the support portion 14a is held by the receiving portion 8, the pressing member 11, and the sealing members 9 and 10. Thus, the resonator 14 is fixed in the solder tank 1. When the pressing member 11 is to be fixed in the receiving portion 8, the front half portion 14b and the rear half portion 14c of the resonator 14 are arranged coaxial with the hole 8b and the hole 8c of the receiving portion 8 without contact and the screws 12 are fastened.

Meanwhile, a workpiece support unit 15 has a base 15a extending forward from a top end of the rear wall 1e of the solder tank 1 and a lever 15b whose one end is rotatably connected to the base 15a. A chuck arm 15d slidably fitted in a long hole 15c formed in a front end portion of the lever 15b has a length from a pair of front and rear stoppers 15e and 15f extending from the left wall 1a to the right wall 1b of the solder tank 1 to the circulation passage 4 between the front wall 1d and the partition member 3 through the space between the base 15a and the front wall 1d of the solder tank 1 and a chuck portion 15g for holding a workpiece 16 in such a manner that it is hung therefrom as a part to be soldered is provided at the end of the chuck arm 15d. To an intermediate portion of the lever 15b is rotatably connected a piston rod 15j of an air cylinder 15I rotatably attached to a column 15h installed upright on the base 15a.

When this air cylinder 15i contracts, the piston rod 15j raises the lever 15b, the lever 15b turns up around a connection point 15k with the base 15a, the chuck arm 15d slides in the long hole 15c and moves up, guided by the stoppers 15e and 15f, and the workpiece 16 held by the chuck portion 15g is pulled up from the molten solder 2 in the circulation passage 4 between the front wall 1d and the partition member 3. When the air cylinder 15i expands while this workpiece 16 is pulled up, the piston rod 15j moves down the lever 15b, the lever 15b turns down around the connection point 15k, the chuck arm 15d slides in the long hole 15c and moves down, guided by the stoppers 15e and 15f, and the workpiece 16 held by the chuck portion 15g is dipped in the molten solder 2 in the circulation passage 4 between the front wall 1d and the partition member 3 while it is hung therefrom and arranged to face the front end surface of the resonator 14 with a predetermined distance therebetween.

According to the constitution of the above embodiment, since the receiving portion 8 has the receiving surface 8d produced by the difference of diameter between the hole 8b on the side of the solder tank 1 and the hole 8c on the opposite side, when the front half portion 14b of the resonator 14 is inserted into the hole 8b through the hole 8c from the outside of the solder tank 1, the rib 11b of the pressing member 11 fitted onto the rear half portion 14c of the resonator 14 is fitted into the hole 8c, the resonator 14 is arranged such that it is not in contact with the hole 8b and the window 11a, and the pressing member 11 is fastened to the receiving portion 8 with the screws 12, the sealing members 9 and 10 are compressed by the rib 11b, the support portion 14a of the resonator 14 and the receiving surface 8d while they store restoring elasticity, the support portion 14a of the resonator 14 is held by the receiving portion 8 and the pressing member 11 fastened to the receiving portion 8. Thus, the resonator 14 can be properly fixed in the solder tank 1. In this state, the resonator 14 is held in the solder tank 1 with the support portion 14a projecting outward at the nodal point f2, and the front half portion 14b and the rear half portion 14c of the resonator 14 are attached to the solder tank 1 in such a manner that it is not in contact with the solder tank 1, the receiving portion 8 and the pressing member 11. Therefore, when vertical ultrasonic vibration is generated by suppling power to the transducer 13 to resonate the resonator 14, the energy of the ultrasonic vibration can be efficiently transmitted to the front end surface of the resonator 14.

Particularly, according to the constitution of this embodiment, since the hole 8b and the hole 8c formed in the receiving portion 8 are coaxial with each other and the rib 11b of the pressing member 11 is formed to be fitted in the hole 8c of the receiving portion 8, when the rib 11b is inserted into the hole 8c and the pressing member 11 is slightly fastened by the screws 12, the resonator 14 is moved vertically or horizontally to form a closed loop-shaped space between the rear half portion 14c of the resonator 14 and the window 11a of the pressing member 11, whereby it can be confirmed easily that the front half portion 14b and the rear half portion 14c of the resonator 14 are arranged in the solder tank 1 in such a manner that it is not in contact with the solder tank 1, the receiving portion 8 and the pressing member 11.

In addition, according to the constitution of this embodiment, since a plurality of threaded holes 8e of the receiving portion 8 and a plurality of through holes 11c of the pressing member 11 are arranged at equal intervals, the fastening force of the pressing member 11 to the support portion 14a of the resonator 14 can be made uniform by forming a substantially uniform space in a circumferential direction between a front end surface of the receiving portion 8 around the threaded holes 8e and a rear surface of the pressing member 11 around the through holes 11c using a measuring tool such as a clearance gauge to fasten the screws 12, thereby making it possible to further reduce the energy loss of ultrasonic vibration applied to the solder 2 and the workpiece 16 from the resonator 14.

On the other hand, in this embodiment, when the solder 2 is poured in the solder tank 1, the heater 7 is activated to generate heat to melt the solder 2 in the solder tank 1, the pump 6 is driven to circulate the solder 2 in the solder tank 1, the workpiece 16 is held by the chuck portion 15 stopped at the upper limit position of the workpiece support unit 15, the chuck portion 15 is moved down to dip the workpiece 16 in the solder 2 as shown in FIG. 7 and arrange the workpiece 16 to face the resonator 14, and the resonator 14 is caused to resonate with vertical ultrasonic vibration by supplying power to the transducer 13, this vertical ultrasonic vibration is applied to the workpiece 16 from the resonator 14 through the solder 2, the molten solder 2 is properly adhered to portions to be soldered of the workpiece 16, and the chuck portion 15g of the workpiece support unit 15 is moved up after the passage of a predetermined time to pull up the workpiece 16 from the solder 2. When the solder 2 adhered to the workpiece 2 is solidified, the workpiece 16 is removed from the chuck portion 15, thereby completing one cycle of applying the solder 2 to the workpiece 16.

Figure 11:
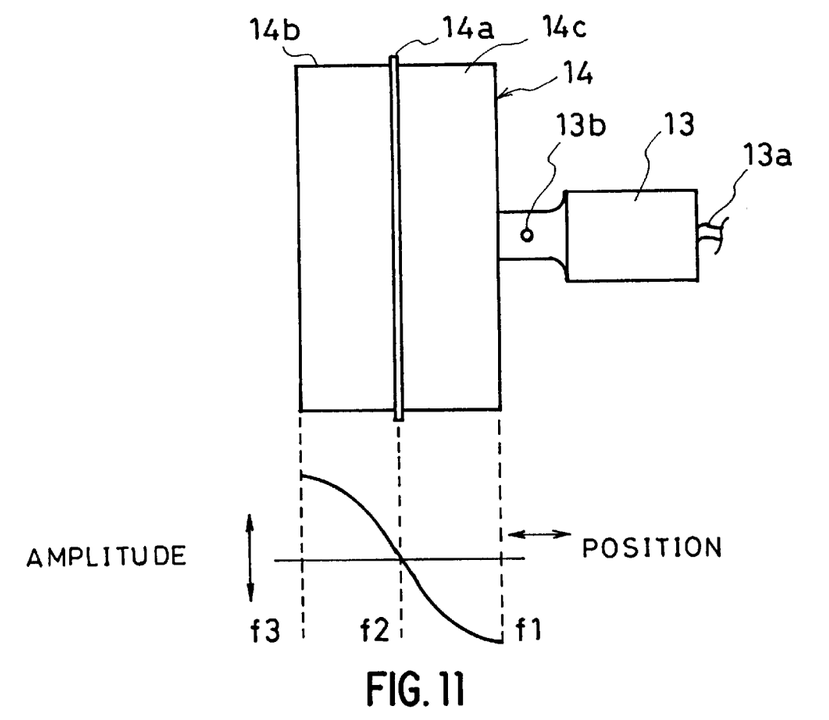
FIG. 11 is a sectional view taken on line B—B of FIG. 12 showing a sixth embodiment of the present invention.
Figure 12:
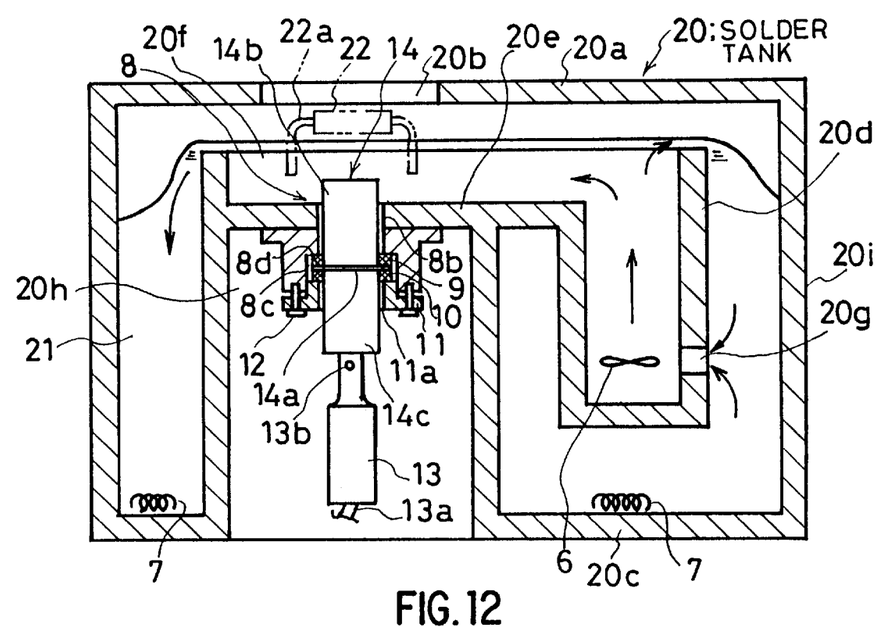
FIG. 12 is a perspective view of the sixth embodiment of the present invention.

FIGS. 11 and 12 show a sixth embodiment of the present invention. This embodiment is characterized by its structure suitable for such a soldering operation that a whole workpiece cannot be dipped in the molten solder 2, for instance, when the solder 2 is applied to a lead wire of an electronic or electric component, or when a lead wire of a packaged component is soldered to a conductor of a printed circuit board by the solder 2. In FIGS. 11 and 12, a solder tank 20 is formed like a box for containing the molten solder 2 and has a working hole 20b for taking in and out a workpiece 22 to be described later shown by a virtual line in FIG. 12 from the solder tank 20 in a top wall 20a and an inner cylinder 20d projecting upward above the bottom wall 20c of the solder tank 20. The upper end of an inner cylinder 20d is located below and apart from the top wall 20a and encloses a plane larger than the working hole 20b. A partition wall 20e is provided in the inner cylinder 20 at a position below the upper end thereof. This partition wall 20e forms a working tank 20f having an open top for containing a predetermined quantity of the molten solder 2 in an upper portion of the inner cylinder 20d. This working tank 20f has a pump 7 in the bottom and an absorption port 20g communicating with the inlet port of the pump 6. A storage chamber 20h for storing the resonator 14 coaxially connected to the output end of the transducer 13 with unshown threaded holes and screws is formed in a lower portion of the solder tank 20 below the partition wall 20e of the working tank 20f.

The receiving portion 8 in which the resonator 14 is fixed with the pressing member 11 is formed in the partition wall 20e. In other words, the sealing member 10 and the pressing member 11 are fitted onto the rear half portion 14c of the resonator 14 and the transducer 13 is connected to the resonator 14 whereas the other sealing member 9 is fitted onto the front half portion 14b of the resonator 14. Thereafter, the front half portion 14b of the resonator 14 is inserted into the hole 8b through the hole 8c of the receiving portion 8 from the outside of the storage chamber 20h without contact while the solder 2 is not present in the working tank 20f of the solder tank 20 so that the top end portion of the resonator 14 projects into the inside of the working tank 20f. Thereafter, the window 11a of the pressing member 11 is fitted onto the rear half portion 14c of the resonator 14 without contact and the screws 12 are screwed into the threaded holes 8e of the receiving portion 8 through the through holes 11c to fix the pressing member 11 to the receiving portion 8, whereby the resonator 14 is attached to the solder tank 20 in such a manner that it is held by the receiving portion 8, the pressing member 11 and the sealing members 9 and 10 which are compressed while they store restoring elasticity.

Inside the solder tank 20, a circulation passage 21 is formed by the peripheral wall 20l, the bottom wall 20c and the inner cylinder 20d of the solder tank 20. A heater 7 is arranged in the circulation passage 21 so that the solder 2 poured into the solder tank 20 is molten by the heating operation of the heater 7 and is circulated in directions shown by arrows, driven by the pump 6. In this embodiment, the solder 2 discharged by the pump 6 passes through the absorption port 20g from the circulation passage 21 between the inner cylinder 20d and the bottom wall 20c of the solder tank 20 and gathers inside the working tank 20f. The solder 2 overflowing from the working tank 20f enters the surface of the solder 2 in the solder tank 20 from the periphery of the upper end of the inner cylinder 20d, returns to the circulation passage 21 and is absorbed by the pump 6 from the absorption port 20g.

According to the constitution of this embodiment, when the molten solder 2 circulates in directions shown by the arrows in FIG. 11, the surface of the solder 2 goes up from the working tank 20f by surface tension and presents a mirror surface, and the resonator 14 is caused to resonate with vertical ultrasonic vibration by supplying power to the transducer 13, the solder 2 can be applied to a lead wire 22a of an electronic or electric component 22 shown by a virtual line in FIG. 11, for example, which is a part of the workpiece, by installing the workpiece in the solder tank 20 through the working hole 20b from above the solder tank 20, dipping the lead wire 22a of the electronic or electric component 22 in the solder 2 in the working tank 20f and arranging it to face the resonator 14.

Not shown in this embodiment, it is possible to apply the solder 2 to the lead wire 22a of the electronic or electric component 22 by holding the electronic or electric component 22 with an unshown workpiece support unit which is provided in the solder tank 20 or provided separately from the solder tank 20.

Figure 13:
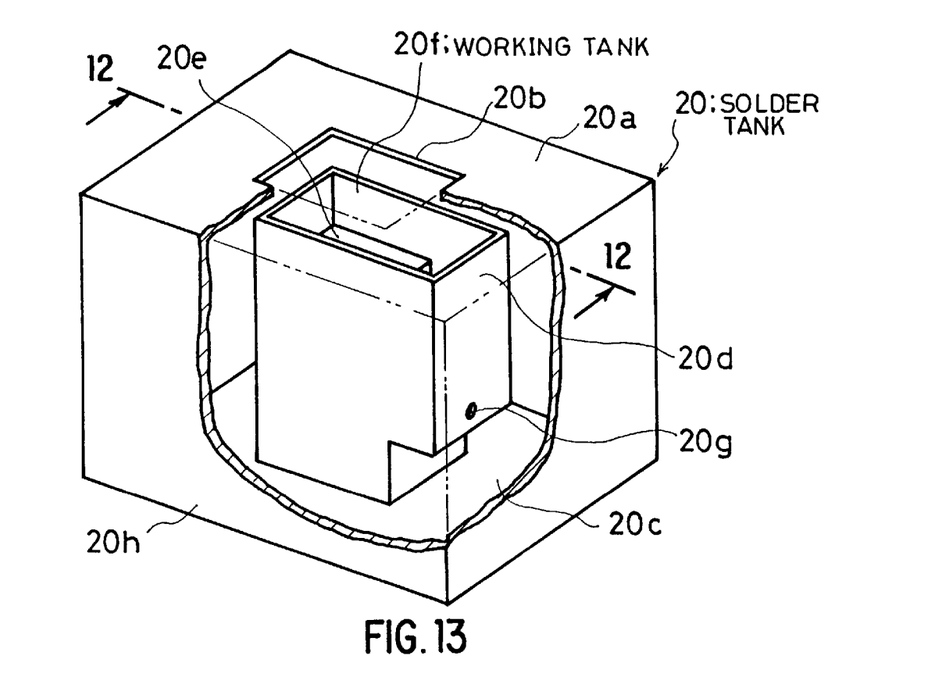
FIG. 13 is a sectional view of a seventh embodiment of the present invention.

FIG. 13 shows a seventh embodiment of the present invention. In this figure, a solder tank 30 is formed like a bathtub having an open top for containing the molten solder 2 and has a heater 31, embedded in the bottom wall 30a thereof, for heating and melting the solder 2 and a receiving portion 32 in the bottom wall 30a. The receiving portion 32 has a hole 32b extending from the the bottom wall 30a to a projecting portion 32a projecting outward from the exterior side of the bottom wall 30a. This hole 32b has a circular section similar to and larger than the front half portion 33b located before (upper side of FIG. 13) the support portion 33a of a resonator 33 and communicates with the inside and outside of the solder tank 30. A hole 32b having a female screw larger than the hole 32b is formed stepwise and coaxial with the hole 32b on the side of the projecting portion 32a of the hole 32b and a step surface formed like a closed loop in a connection portion between the hole 32c and the hole 32b serves as a receiving surface 32d for accepting the support portion 33a of the resonator 33. A pressing member 34 for holding the resonator 33 in the solder tank 30 with the receiving portion 32 has a male screw to be screwed into the female screw in the hole 32c on the outer peripheral surface thereof and a tool engagement portion 34a in which a male screw is not formed in the rear end portion of the outer peripheral surface. A window 34b having a circular section similar to and larger than the rear half portion 33c located after the support portion 33a of the resonator 33 is formed in the center of the pressing member 34. Sealing members 35 and 36 are formed from a material to which the molten solder 2 is hardly adhered, such as fluororesin or teflon and has substantially the same closed loop shape as the receiving surface 32d.

According to the constitution of this embodiment, the sealing members 35 and 36 are fitted onto the front half portion 33b and the rear half portion 33c of the resonator 33, the front half portion 33b of the resonator 33 is inserted into the hole 32b through the hole 32b from the outside of the solder tank 1 without contact while the solder 2 is not present in the solder tank 30, the top end portion of the resonator 30 is projected into the inside of the solder tank 1, the window 34b of the pressing member 34 is fitted onto the rear half portion 33c of the resonator 33, the pressing member 34 is fitted into the hole 32c of the receiving portion 32 by engagement between the male screw and the female screw, a tool such as a spanner is inserted into the tool engagement portion 34a of the pressing member 34, and the pressing member 34 is fastened and fixed to the receiving portion 32, whereby the support portion 33a of the resonator 33 is held by the receiving portion 32, the pressing member 34 and the sealing members 35 and 36. Thus, the resonator 14 can be fixed in the solder tank 30.

In this state, the solder 2 is poured into the solder tank 30, the heater 31 is activated to generate heat to melt the solder 2, the resonator 33 is caused to resonate with vertical ultrasonic vibration by supplying power to the unshown transducer connected coaxially to the rear half portion 33c of the resonator 33 with an unshown threaded hole and an unshown screw screwed into the hole, an unshown workpiece is dipped in the molten solder 2 from above the solder tank 30, whereby the solder 2 can be applied to the workpiece. Therefore, there can be provided an ultrasonic vibration soldering apparatus having a simple structure which is suitable for small-quantity production and does not circulate the solder 2.

In the above fifth to seventh embodiments, since the sealing members 9, 10, 35 and 36 are arranged on both sides of the support portions 14a and 33a of the resonators 14 and 33, the solder 2 is prevented from leaking from the contact surface between the receiving portion 8 and the support portion 14a and the contact surface between the pressing member 11 and the support portion 14a even when the solder 2 is molten at a high temperature of 230° to 300° C. and the surface tension of the solder 2 lowers. However, when the melting temperature of the solder 2 is low and the surface tension is high, the solder 2 can be prevented from leaking from the contact surface between the receiving portion 8 and the support portion 14a and the contact surface between the pressing member 11 and the support portion 14a even if the sealing members 9, 10, 35 and 36 are omitted, though this depends on type and melting temperature of the solder 2.

Figure 14:
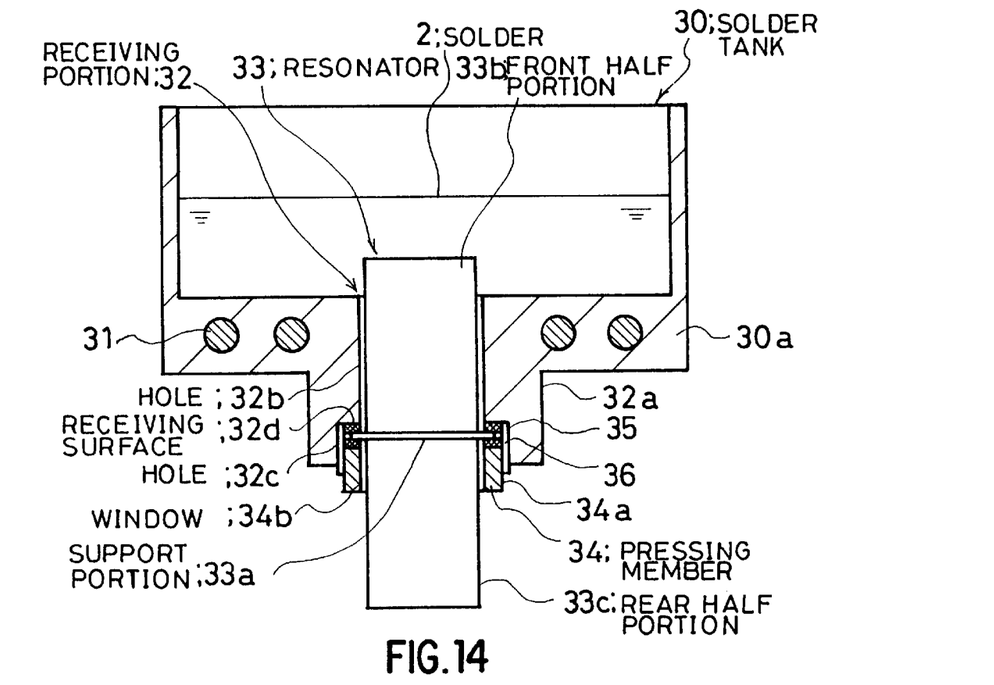
FIG. 14 is a diagram showing the relationship among the resonator, transducer and ultrasonic vibration waveform of an eighth embodiment of the present invention.

FIG. 14 shows an eighth embodiment of the present invention. In the figure, a resonator 40 equivalent to the resonators 14 and 33 of the first to third embodiments comprises an ultrasonic horn 41 which is formed like a rod and made from an alloy such as titanium alloy, a rod-shaped booster 42 which is coaxially connected to one end of the ultrasonic horn 41 with an unshown threaded hole and an unshown screw and made from a material such as titanium, aluminum or hardened iron, and a rod-shaped fin booster 43 which is coaxially connected to one end of the booster 42 with an unshown threaded hole and an unshown screw and made from a material having high heat conductivity such as aluminum. To one end of this fin booster 43 is coaxially connected the output end of a transducer 44 which is equivalent to the transducer 13 of the fifth to seventh embodiments with an unshown threaded hole and an unshown screw. When seen from this transducer 44, the fin booster 43 has a length equal to ½ the wavelength from the maximum vibration amplitude point f11 to the next maximum vibration amplitude point f13 through a nodal point f12, the booster 42 has a length equal to ½ the wavelength from the maximum vibration amplitude point f13 to the next maximum vibration amplitude point f15 through a nodal point f14, and the ultrasonic horn 41 has a length equal to ½ the wavelength from the maximum vibration amplitude point f15 to the next maximum vibration amplitude point f17 through a nodal point f16. A closed loop-shaped support portion 41a is provided on the outer peripheral surface of the ultrasonic horn 41 at the nodal point f16. The output ends of the booster 42, the fin booster 43 and the transducer 44 have recess portions 42a, 42b, 43a, 43b and 44a for accepting an unshown tool for connection and disconnection in the outer peripheral surfaces thereof. The fin booster 43 is produced from an aluminum bar by cutting and has a plurality of grooves 43c in the outer peripheral surface thereof which are arranged at equal intervals in a circumferential direction and formed to have good radiation properties.

According to the constitution of this embodiment, when the support portion 41a of the ultrasonic horn 41 of the resonator 40 is held by the receiving portion 8 or 32 and the pressing member 11 or 34 and fixed in the solder tank 1, 20 or 30 to carry out a soldering operation like the resonators 14 and 33 of the fifth to seventh embodiments, heat transmitted from the molten solder 2 to the fin booster 43 through the ultrasonic horn 41 and the booster 42 is radiated by the fin booster 43 which is made from a material having high radiation properties and hardly transmitted to the transducer 44, thereby making it possible to protect the transducer 44 from heat.

Since a plurality of fins are provided in a longitudinal direction of the fin booster 43 on the outer peripheral surface of the fin booster 43 and grooves 43c are formed between adjacent fins, the radiation area is large. Therefore, the radiation properties of the fin booster 43 can be further improved.

Since the plurality of grooves 43c in the fin booster 43 are arranged at equal intervals in a circumferential direction, the depths of the grooves 43c are made the same and the lengths of the grooves 43 are also made the same to locate the center of gravity of the fin booster 43 at the center of the fin booster 43, whereby the fin booster 43 can transmit ultrasonic vibration from the transducer 44 to the booster 42 efficiently.

Figure 15:
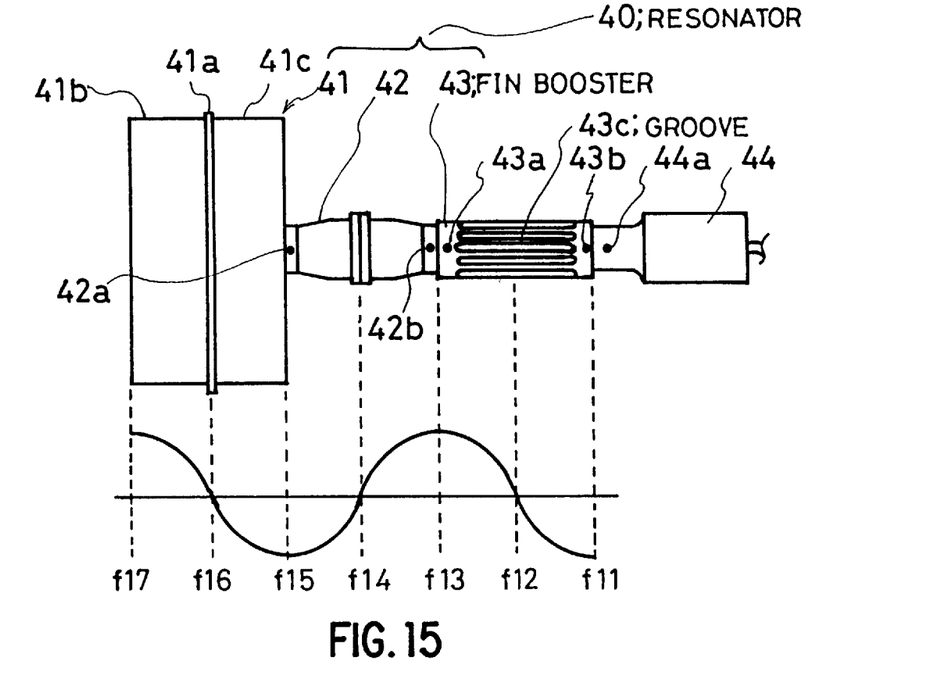
FIG. 15 is a diagram of a fin booster according to a ninth embodiment of the present invention.
Figure 16:
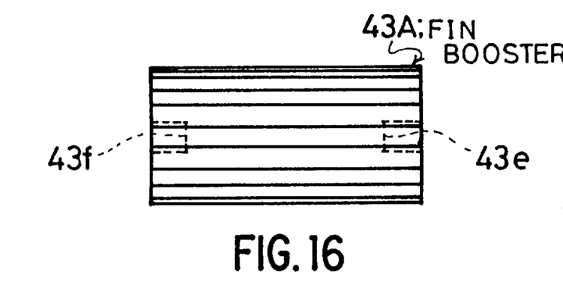
FIG. 16 is a diagram of another fin booster according the ninth embodiment of the present invention.

FIGS. 15 and 16 show fin boosters different from the above fin booster. The fin booster 43A shown in FIG. 15 has a plurality of grooves 43d which are arranged at equal intervals in a circumferential direction, are the same in depth and are formed up to both ends of the fin booster 43A. The fin booster 43A has threaded holes 43e and 43f having a predetermined depth in the center portions of both end surfaces thereof. The transducer 44 is connected to the fin booster 43A with the threaded hole 43e as shown in FIG. 14, and the booster 42 or the ultrasonic horn 41 is connected to the fin booster 43A with the other threaded hole 43f.

The fin booster 43B shown in FIG. 16 has a plurality of grooves 43g which are the same in depth and arranged at equal intervals in a circumferential direction and the grooves 43g are larger in number and formed deeper than those of the fin booster 43A shown in FIG. 15 to further improve heat radiation properties. Both end surfaces of the fin booster 43B have respective projecting portions 43h and 43i having an outer peripheral surface in contact with the semi-circular bottom portion of each groove 43g, and threaded holes 43j and 43k similar to the threaded holes 43e and 43f shown in FIG. 15 are formed in the end surfaces of the projecting portions 43h and 43l, respectively.

What is claimed is:

1. An ultrasonic vibration soldering apparatus for soldering a workpiece by applying an ultrasonic vibration to a molten solder in a solder tank by means of a resonator connected to a transducer for generating a longitudinal ultrasonic vibration having a predetermined frequency, said apparatus comprising:

a support portion projecting outwardly from said resonator at a nodal point of said ultrasonic vibration, a receiving portion provided on said solder tank and having a receiving surface provided between a through-hole having a diameter larger than an outer diameter of said resonator but smaller than that of said support portion and a recess hole having a diameter larger than that of said support portion of said resonator and being coaxial with said through-hole, a pressing member for pressing said support portion against said receiving surface, fastener means for attaching said pressing member to said receiving portion so that said support portion is sandwiched between said pressing member and said receiving surface to thereby attach said resonator to said solder tank such that said resonator is not in contact with said solder tank, said receiving portion, and said pressing member, thereby maximizing transmission of energy of said ultrasonic vibration.

2. An ultrasonic vibration soldering apparatus for soldering a workpiece by applying an ultrasonic vibration to a molten solder in a solder tank by means of a resonator connected to a transducer for generating a longitudinal ultrasonic vibration having a predetermined frequency, said apparatus comprising:

a support portion projecting outwardly from said resonator at a nodal point of said ultrasonic vibration, said solder tank having a through-hole having a diameter larger than an outer diameter of said resonator, said support portion being attached to said solder tank around said through-hole, and slots provided in said resonator in both front and rear sides of said support portion as a boundary to thereby prevent said molten solder from leaking from said slots.

3. An ultrasonic vibration soldering apparatus for soldering a workpiece by applying an ultrasonic vibration to a molten solder in a solder tank by means of a resonator connected to a transducer for generating a longitudinal ultrasonic vibration having a predetermined frequency, said apparatus comprising:

an ultrasonic horn, a support portion projecting outwardly from said ultrasonic horn at a nodal point of said ultrasonic vibration, and a fin booster made from a heat conductive material and interposed between said ultrasonic horn and said transducer to thereby maximize heat radiation from said resonator.

* * * * *